Jan. 19, 1943.                E. H. MITCHAM                2,308,706
                              VEHICLE BARRIER
                           Filed Nov. 18, 1940            2 Sheets-Sheet 1
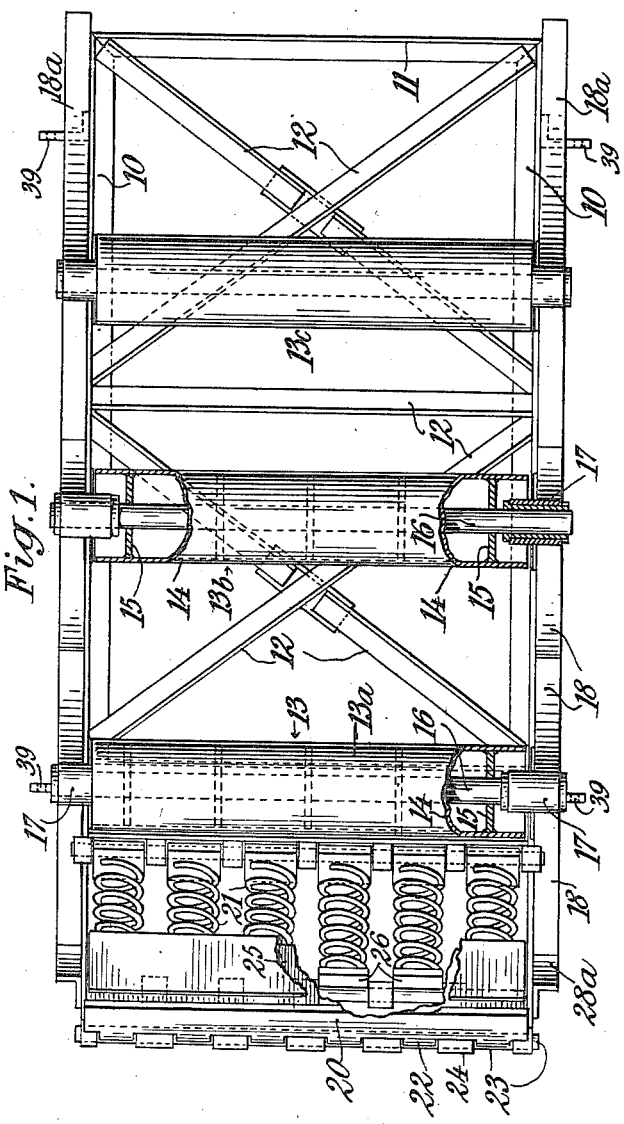
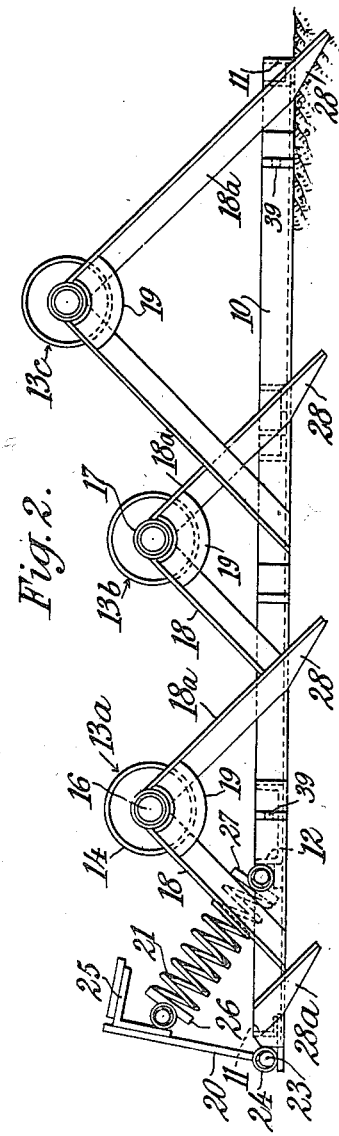
INVENTOR
Edward H. Mitcham
BY
Fraser, Myers & Manley
ATTORNEYS.

Jan. 19, 1943.  E. H. MITCHAM  2,308,706
VEHICLE BARRIER
Filed Nov. 18, 1940  2 Sheets-Sheet 2
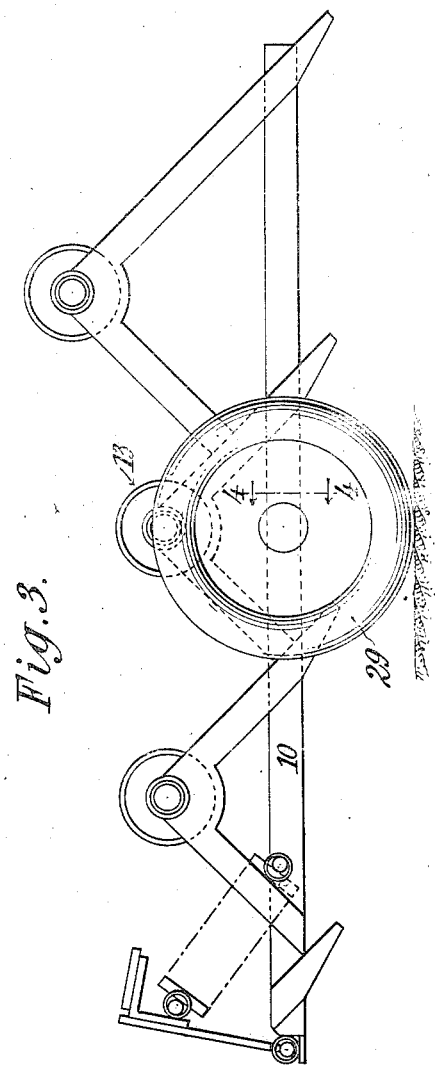
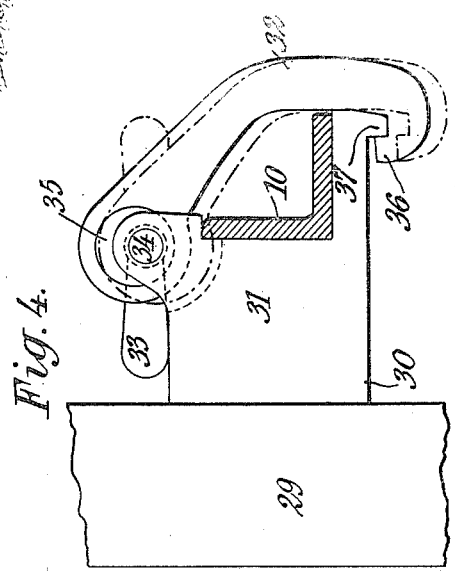
INVENTOR
Edward H. Mitcham
BY
ATTORNEYS.

Patented Jan. 19, 1943

2,308,706

UNITED STATES PATENT OFFICE 2,308,706

VEHICLE BARRIER

Edward H. Mitcham, New York, N. Y.

Application November 18, 1940, Serial No. 366,123

3 Claims. (Cl. 256—1)

This invention relates to vehicle barriers and is particularly concerned with devices of this general class designed to halt or impede military tanks or other mechanized equipment employed in modern warfare.

The better known military vehicle barriers include the land mine, the pitfall concealed in a vehicle path, and the so-called "asparagus bed" comprising a large number of rails, logs or concrete posts sunk in the ground in an upright position and so spaced that ordinary vehicles can not proceed between them. These devices all have the inherent disadvantage of immobility. They must be fully erected long prior to any attack, and this factor tends to give away their location to every prospective enemy. Such permanent defenses as these, unless extended along an entire frontier which is rarely practicable, serve primarily to divert an attack from favorable routes to less favorable ones.

The principal object of the invention is to provide a barrier defense against fast moving motorized military vehicles, which may be thrown up in roadways or other less favorable routes, not already covered by permanent defenses, at the last possible moment before an attack is expected.

It is a more specific object of the invention to provide a barrier unit of such light weight and relatively small dimensions that one or more of them may be carried upon a truck, and others be towed as trailers by that truck, to a chosen location where all may be erected within a very short time and by a small truck crew. This permits of the creation of a mobile defense against tanks or armored cars which may be employed to supplement permanent defenses after enemy reconnaissance has ceased and the course for its attack has been selected.

The invention proceeds upon the theory that a motor vehicle may be as effectively stalled by a loss of traction as by running against an impenetrable wall. The present barrier accordingly includes a tread portion which is adapted to support a vehicle in such a way as to destroy its traction with the ground. This tractionless tread is preferably formed by a series of cylindrical rollers adapted to be disposed crosswise of a roadway, and one behind another in such spaced relation that any two of them can engage and support the driving wheels of an armored car, and any three of them enough of the crawlers of a tank, in out-of contact relation with the ground so that their driving effect will be wasted in mere idle rotation of the rollers.

Unless the tractionless tread were extended for some very considerable distance along the roadway, it is altogether probable that a fast-moving vehicle would carry completely over it by momentum. This is avoided in the preferred form of the invention by employing shock absorbing means located in advance of the first roller to dissipate some considerable part of the momentum of the vehicle, and by mounting the rollers at some little height above the ground and at successively higher levels so that the vehicle must lift itself after losing traction and thus dissipate the remaining part of its momentum. These two factors, that is to say, the shock absorbing means, and the elevation of the rollers, may be employed in proper ratio to bring the vehicle to a full stop with its wheels or crawlers lying on the rollers.

The various component elements may be constructed as separate units, in which case any desired number of rollers may be included in a complete barrier along with one or more impact sections. It is preferred, however, to include several roller elements and an impact section in a single unit. This has the advantage of facilitating handling and transportation and of speeding erection, and gives rise to other advantages which will later be considered. It is made possible by reason of the fact that this type of barrier is in no way dependent on its weight for effectiveness.

It is evident that a barrier of this general kind must be of temporary nature and can not constitute a complete defense. An approaching column can always detour where the terrain will permit it, the barriers may be removed by the enemy, and even if one vehicle is completely stalled on a barrier, others can push it off. It does, however, effectively serve to confuse a fast moving column of approaching vehicles and to slow it up sufficiently to allow of destruction by gun-fire which is its prime purpose.

The foregoing objects, as well as others, and the manner in which they are carried out, will be more fully understood from a consideration of the following description in the light of the accompanying drawings in which Fig. 1 is a plan view of a barrier unit embodying the invention, certain parts thereof being broken away better to show underlying ones. Fig. 2 is a side elevational view of the unit of Fig. 1. Fig. 3 is another side view of the unit illustrating its conversion into a trailer vehicle, and Fig. 4 is a cross-sectional view taken on the line 4—4 of Fig. 3.

The preferred form of barrier, as illustrated in Figs. 1 and 2, includes a frame having sides 10 of standard structural steel welded to ends 11 of similar material and suitably stiffened by cross-braces 12 to form a base which is adapted to rest upon the ground or upon a road-bed and to support the other components of the barrier as a unit.

The tractionless tread portion of the unit is formed by a series of rollers 13 arranged one behind another and journaled for free rotation in the frame. Obviously, any desired number of them may be employed, but where weight is an important factor, as it is in any portable military equipment, there should be as few rollers as possible. In a barrier designed for defense against light-weight armored cars and tanks of medium weight, for example, the tread may comprise three 12" diameter rollers spaced so that any two of them may engage and support the driving wheels of the car, and all three of them enough of the tank, to maintain the wheels or crawlers out of contact with the ground. Regardless of the number employed, it is desirable to space them as far apart as possible. If, for example, the rollers were closely spaced, it would be a fairly easy matter to push a stalled vehicle from the barrier on to firm ground. But where the rollers are well spaced apart, as in the illustrated unit, the driving elements of the vehicle tend to sink down between the rollers, and it is evident that the vehicle can be gotten off only with some considerable difficulty.

In the preferred embodiment the rollers are mounted in the frame of the unit at some little height above its base and at increasingly higher elevations. They thus serve as obstructions in the pathway over which a vehicle must lift itself, as well as their prime function of providing the tractionless tread. The first roller 13a is mounted at such an elevation as to be protected by the impact section: and the second roller 13b may be mounted at the same level as the first, as shown, or at a slightly lower or higher level. The last roller 13c, however, is mounted considerably above either of the others. It thus serves to absorb any residual momentum of a vehicle riding upon the barrier, as well by impact as by forcing the vehicle further to lift itself, and thus to bring that vehicle to a full stop.

The rollers 13 must have sufficient strength to support a vehicle in a stalled position, and whatever additional strength is needed to absorb those impact stresses to which the rollers may be subjected. In the preferred embodiment each roller comprises a cylindrical shell 14 having a series of spider elements 15 welded to its inner sides and to the axle 16 at fairly closely spaced intervals. The latter element is adapted to be journaled for rotation in bearings 17 mounted in upright portions of the frame which may conveniently be formed by welding pairs of legs 18, disposed in inverted V form, to each other, to the bearings 17, and to the side elements 10 of the frame. Web elements 19, at the junction of the legs, serve to reinforce the bearings, and cross-bracing may be employed to stiffen the structure if that is desired.

The shock absorber section of the illustrated unit is of the resilient bumper type comprising a metal plate 20 hinged at its lower edge to the base of the frame in a rearwardly tilting position, and resiliently supported by a series of coil springs 21. In the illustrated structure the plate has a series of extensions 22 formed along its lower edge to which a pivot rod 23 is secured, and the base of the frame carries a series of spaced ring-like bearing portions 24, in which the rod is journaled to form the hinge connection between the plate and frame. A girder 25 of standard structural steel is secured to the upper rear side of the plate for strengthening and other purposes and carries a series of hinged face plates 26, each of which engages one end of one of the springs 21. The other end of each spring is engaged by a similar face plate 27 which is pivotally secured to one of the cross braces 12 of the base portion of the frame. While this shock absorber might be located at the rear of the barrier behind and above roller 13c, or between any two of the rollers, it is preferably attached to the forward end of the frame in line of vehicle approach where it may absorb a very large part of the momentum of the vehicle striking it, and slow up that vehicle very materially before it rides on to the rollers. Its location at that point has the further advantage of providing an approach in the nature of an inclined plane which will throw the forward end of the vehicle up onto the first roller, relieving that roller of impact stresses which it might otherwise have to take. In fact, the shock absorber section may comprise nothing more than a simple inclined plane suitably braced and located in front of the first roller where it may serve to dissipate a part of the kinetic energy of an approaching vehicle by impact and by throwing the vehicle up on to the first roller.

It is self-evident that the barrier unit must be well anchored at the time of erection so that it may not be pushed aside by the first vehicle which approaches it. While any form of anchoring means may be employed, the illustrated unit is provided with a series of anchoring spades 28 which may conveniently be formed by extending each of the legs 18a of the uprights for a few inches below the base portion of the frame, and by welding one or more short pieces of angle iron 28a to the sides 10 of the frame in more or less parallel relation to the legs 18a. It will be noted that all of these spades are extended rearwardly so that any movement of the barrier in that direction must tend to drive them into the ground. They are thus well adapted to oppose any movement of the barrier by any vehicle striking against its forward end.

The described barrier is a complete unit of such dimensions and weight that one or two of them may readily be loaded on a truck and be hauled rapidly from a depot to a chosen point of defense. There the units may be quickly unloaded, and be shifted by hand to a selected point. In moving the unit from along-side the truck to the exact point of erection, the uppermost one of the rollers may be employed as a wheel. It is only necessary to tip a unit from the truck over up on its back, and then to roll it along the ground to the selected site where it may again be tipped to upright position for final installation. The latter operation involves little more than merely placing the barrier crosswise of the line from which an attack is expected. If the road on which it is placed is a hard-surfaced one, holes must first be dug for accommodating the anchoring spades. Aside from that, however, the erection operation involves little more than a shifting of the barrier from a truck to position, which may easily be performed by a few men comprising the truck crew.

In order further to facilitate transportation, the unit is provided with wheels 29, as shown in Fig. 3, on which it can be rolled as a trailer behind the truck, and in fact be used to carry still another unit in pick-a-back fashion. These wheels may, if desired, be mounted upon the ends of an axle which is permanently secured to the frame elements 10. With such an arrangement some little time might be lost in removing the wheels from the axle during the erection of the unit. It is preferred, therefore, to employ wheel units, each comprising a wheel 29 journaled more or less permanently on a stub axle 30 having a shank portion 31 which is adapted to fit over one of the side-pieces 10 of the barrier frame and to be locked in place by a clamp 32, as shown in full lines in Fig. 4. Whenever it becomes necessary to remove the wheel unit from the frame, this may be quickly accomplished by turning the handle 33, its shaft 34 and its eccentric portion 35 to lower the latch 32 so that its nose 36 may clear the detent 37, as shown in dotted lines in Fig. 4. The latch can then be swung about the eccentric to clear the frame and thus to allow the separation of the wheel unit from the frame. It is self-evident that the attachment of these wheel units and their removal from the barrier is an extremely simple operation which can be performed in a moment or two by one or two men.

The exact dimensions and constructional details of the barrier unit will vary in accordance with the nature of the service which it is designed to perform. It should be of a length comparable with that of a vehicle whose progress it is to impede, that is to say, it should be long enough to allow the vehicle to ride up on its rollers, and it must include whatever number of rollers are needed to form an effective tractionless tread. The width of the unit is not such a critical factor. It should be made just as wide as is consistent with easy transportation, and any additional needed width can readily be made up by mounting two or more units in side-by-side relation and bolting them together, clamps 39 being provided to facilitate interconnection.

The strength of the barriers is again a factor which is dependent upon contemplated service. If the units are to be employed as a defense against relatively light and high-speed armored cars and tanks, then, of course, the shock absorbing section and rollers must be made of appropriate strengths to resist the stresses which will be created by vehicles of this class. Obviously, heavier units must be employed for defense against heavier vehicles.

Since certain changes may be made in the embodiment of the invention without departing from the true principles thereof, it is intended that the foregoing shall be construed in a descriptive rather than in a limiting sense.

What I claim is:

1. A barrier for impeding the progress of an automotive vehicle comprising a frame having a base portion adapted to rest on a vehicle path and a plurality of upright portions formed along the sides of said base portion, bearings in said uprights, a plurality of rollers extending crosswise of said frame and journaled in said bearings, said rollers being disposed above said base sufficiently to constitute a substantial obstruction to an automotive vehicle, and being so spaced apart that they are adapted to support and provide a substantially tractionless tread for the driving mechanism of such an automotive vehicle, and means extending downwardly from said base and serving to anchor said base in the vehicle path, the said uprights comprising a pair of legs joined together in the form of an inverted V, and to said base portion, and the rear leg of each upright being extended below the base of the frame to provide said anchoring means.

2. A portable vehicle barrier comprising a frame adapted to be positioned in a vehicle path, a plurality of uprights on said frame, and a plurality of roller elements journaled for rotation in said uprights in substantially elevated positions with respect to said frame and the vehicle path in which it is located, said roller elements being so spaced apart that they may support the driving mechanism of an automotive vehicle and provide a tractionless tread therefor, the last of said rollers having its topmost surface disposed substantially above the comparable part of the adjacent roller whereby such last roller may serve as a wheel to facilitate movement of the barrier in an upside-down position.

3. A portable vehicle barrier according to claim 2, further characterized by the provision of resilient means mounted in front of the first of said roller elements with respect to the direction of vehicle approach, said means being adapted to absorb a portion of the impact of a vehicle striking against it and to direct such vehicle upwardly to said roller elements.

EDWARD H. MITCHAM.